United States Patent [19]

Qin

[11] Patent Number: 5,192,896

[45] Date of Patent: Mar. 9, 1993

[54] VARIABLE CHOPPED INPUT DIMMABLE ELECTRONIC BALLAST

[76] Inventor: Kong Qin, 13928 Mustang Hill La., Gaithersburg, Md. 20878

[21] Appl. No.: 866,514

[22] Filed: Apr. 10, 1992

[51] Int. Cl.$^5$ .................... H05B 41/29; H05B 41/391
[52] U.S. Cl. .................................. 315/224; 315/219; 315/278; 315/282; 315/291; 315/DIG. 4
[58] Field of Search .................. 315/57, 70, 219, 224, 315/276, 278, 282, 291, 306, DIG. 2, DIG. 4, DIG. 5

[56] References Cited

U.S. PATENT DOCUMENTS 4,350,933 9/1982 Agarwala et al. .................. 315/278

Primary Examiner—David Mis
Attorney, Agent, or Firm—Arent Fox Kintner Plotkin & Kahn

[57] ABSTRACT

A low cost, high efficiency, dimmable electronic ballast for gas discharge lamps which can be controlled by a traditional phase controlled dimmer is disclosed. This ballast includes a push-pull, parallel resonant, self-oscillating inverter which is comprised of a DC base drive circuit and an adjustable, loosely coupled (between the primary and the secondary) transformer with a pair of magnetic shunts, and a LC filter which has both common and differential mode filter functions to reduce the high frequency interference and improve the power factor. The Q factor of the LC filter will maintain a nearly constant lamp current at low light levels. Wide range dimming (100% to less than 1%) is achieved. A delay start circuit and an overvoltage (open circuit) protection circuit are connected to the LC filter. The overvoltage protection circuit can be connected to either the AC side or DC side of the ballast. The circuit of the invention is capable of removing the striation effect in gas discharge lamps that typically occurs at low light levels.

9 Claims, 8 Drawing Sheets

TOP VIEW

SIDE VIEW.

← 14

PINS   WINDING AREA   PINS

VARIABLE CHOPPED INPUT DIMMABLE ELECTRONIC BALLAST

BACKGROUND OF THE INVENTION

1. Field of the invention

This invention relates generally to the field of high frequency electronic ballasts for gas discharge lamps, and more particularly to those ballasts which permit lamp dimming through the use of a phase controlled dimmer (triac dimmer) and which allow wide-range dimming (100% - 1% or less) for fluorescent lamps.

2. Description of the prior art

The basic operating principle of a gas discharge lamp was described by William E. Forsythe and Elliot Q. Adams in 1948 in a book entitled "Fluorescent and Other Gaseous Discharge Lamps," and later by John F. Waymouth in 1971 in a book entitled "Electric Discharge Lamps."

The basic principles for dimming gas discharge lamps are well known. The prior art dimmer circuits all suffer from certain disadvantages as described below. For example, a circuit is disclosed in U.S. Pat. No. 4,392,087 to Zansky which is capable of operating lamps at a dimming level about 10% of full brightness. The circuit has an inverter, operates with an AC voltage feedback base driver, and has an output transformer with a fixed leakage inductor. The tuning capacitor is connected to a secondary winding and resonated with a leakage inductor. This circuit has a number of inefficiencies. The filament voltage is not increased at low brightness levels which significantly reduces lamp life. The inverter does not switch under zero voltage or zero current which results in a relatively high switching loss. Also the base drive AC voltage is reduced when the lamp brightness is reduced. Consequently, the transistors are not well saturated and the inverter's switching on loss is relatively high. In other words, the circuit is very inefficient. Because this circuit is not operating in the constant current mode, this ballast will not be able dim down to 1% of full brightness.

Another prior dimmer circuit is disclosed in U.S. Pat. No. 4,001,637 to Gray. This circuit is comprised of a phase-controlled dimmer with a non-dissipative current limiting capacitor and a DC current smoothing filter. This dimmer circuit suffers from certain disadvantages in that it is only capable of operating ballasts with series inductors or auto-transformers.

Yet another prior circuit is disclosed in U.S. Pat. No. 4,704,561 to Dietl. This circuit is configured as a half-bridge inverter with a series resonate tank load. The output transistor's base drive current is actively controlled by another transistor. This is a costly feature. The inverter does not operate under zero current or zero voltage. Therefore it is not very efficient. The inverter needs an additional pulse generator to control the light output which makes this circuit impractical to use.

Another prior circuit is disclosed in U.S. Pat. No. 5,004,959 to Nilssen. This ballast comprises a self-oscillating, half-bridge inverter with a saturable drive transformer. The lamp is in parallel with a series tank circuit. By changing the position of a permanent magnet within the saturation drive transformer, the operating frequency of the inverter is changed. By adjusting the operating frequency, the lamp current and, consequently, the brightness level is adjusted. This circuit is disadvantageous because it requires a mechanical link to dim the light and it is incapable of being remotely controlled.

Another prior circuit is disclosed in U.S. Pat. No. 4,859,914 to Summa. This circuit has a single transistor self-oscillator and a TRIAC open circuit protector. This circuit dims by a photo cell (automatically) or by an external potentiometer with additional control wires. The input choke has a single-winding inductor in parallel with a capacitor. This circuit is disadvantageous because it requires a special fixture for the photocell to operate properly and it requires an extra control line which makes the installation of the ballast complicated and expensive.

A last prior circuit is disclosed in U.S. Pat. No. 5,001,386 to Sullivan et al. This circuit has a pulse duration modulation section to drive a half-bridge inverter with a series tank circuit. By adjusting the duration of the pulse, the brightness level is controlled down to 1%. However, this circuit requires an external control line which makes the installation of the ballast complicated and expensive. This circuit also uses a DC current to bias the lamps for reducing the striations in the lamp at the low brightness levels.

As can be ascertained from the description of prior dimmable gas discharge lamps above, there is a need for a dimmable electronic ballast for gas discharge lamps which has a small number of components and is therefore inexpensive to produce and is highly efficient.

There is also a need for a dimmable electronic ballast for gas discharge lamps which exhibits superior performance characteristics over the prior circuits.

Additionally, there is a need for a dimmable electronic ballast which can be controlled by a traditional two wire, phase-controlled dimmer. There is an additional need for a dimmable electronic ballast with an improved power factor and with reduced radio frequency interference.

There is yet an additional need for a dimmable electronic ballast with a delayed starting feature and with overvoltage protection.

SUMMARY OF THE INVENTION

It is therefore an object of the present invention to provide a dimmable electronic ballast for gas discharge lamps which is designed with a reduced number of components thereby enabling it to be produced relatively inexpensively and enabling it to be operated more efficiently and to exhibit superior performance characteristics.

It is a further object of this invention to provide a dimmable electronic ballast which can be controlled by a traditional two wire, phase controlled dimmer, and contains a number of performance advantages over previous designs.

Another object of this invention is to provide a dimmable electronic ballast with an AC line filter to improve the power factor of the ballast and reduce radio frequency interference.

A further object of this invention is to provide a dimmable electronic ballast with a means for delayed starting and overvoltage protection.

Additional objects and advantages of the invention will be set forth in part in the description which follows, and in part will be obvious from the description, or may be learned by practice of the invention. The objects and advantages of the invention may be realized and attained by means of the instrumentalities and combinations pointed out in the appended claims.

To achieve the objects and in accordance with the purposes of the invention, as embodied and broadly described herein, this invention comprises a dimmable electronic ballast for one or more gas discharge lamps comprising L-C filter means for receiving a variable chopped AC input current from an AC power source and for smoothing said received variable chopped AC current and for outputting smoothed current; AC-DC rectifier means, connected to receive the smoothed AC current output from the L-C filter means and acting to convert the smoothed AC current to DC voltage and outputting said DC voltage; push-pull parallel resonant self-oscillating switching inverter means, connected to receive the DC current output from the AC-DC rectifier means, for generating and outputting a sinusiodal high frequency voltage; and isolation transformer means, connected to receive the sinusoidal high frequency voltage output from the switching inverter for adjusting the light level of the gas discharge lamp.

In general in operation, the plasma in a fluorescent lamp operating on ac voltage is separated into alternating bright and less bright regions independent of the frequency of the driving voltage. The contrast between these regions increases with decreasing lamp brightness and these striations become much more apparent at brightness levels corresponding to a few percent of full brightness. The characteristic length which separates the striations is determined by the distance required for an electron to acquire sufficient energy to excite a mercury atom from the ground state to the $^3P_1$ state, which is equal to 4.8 eV. This distance is then 4.8 L/V, where L is the lamp length and V is the voltage across the lamp. For a fixed tube type lamp, the diameter L/V is virtually constant. For a T-12 lamp this expression gives a 1.7 inch separation which agrees well with the observed value. Since the impedance of a fluorescent lamp varies with the diameter L/V, the striation separation will also vary with the diameter.

The striations can be viewed as an interference pattern generated by electron-mercury atom collisions involving electrons with a net velocity in one direction along the tube length and like collisions involving electrons moving in the opposite direction. Due to different voltages across the lamp which vary with brightness, the striation pattern generally moves in one direction or the other for the length of the tube. The striations are stationary only at a few brightness levels or a few voltage levels. If one intentionally introduces a DC voltage of sufficient magnitude, the striations can be made to move at a rate such that they are imperceptible to the human eye. The ballast of the present invention includes a switching inverter section having a push-pull, parallel resonant self-oscillator with a DC base drive circuit. The DC base drive circuit reduces the switch on loss, and the parallel resonant self-oscillator reduces the switching loss. Therefore, this switching inverter generates very little heat which increases its reliability and efficiency.

The ballast of the present invention also includes an output transformer having a loosely coupled primary and secondary winding, and a pair of magnetic shunts. By using the leakage inductance of the output transformer, the effect of the current limiting circuitry is eliminated. By adjusting the magnetic shunts, the output power can be adjusted which results in improved performance especially at low level light output. The output voltage of the filament winding increases as the light output decreases. This feature will significantly increase the life time of the lamps. A specially designed bobbin for producing the transformer is disclosed.

Separate circuitry has been incorporated into the output stage of the ballast for eliminating the striation effect and the lamp diode effect, as well as reducing the crest factor. In addition, a specially designed inductor which has both common and differential mode filter functions is included in the ballast and is used to improve the power factor and to reduce radio frequency interference. An overvoltage protection function and a delayed starting function is achieved by discontinuing the L-C loop.

The accompanying drawings, which are incorporated in and constitute a part of this specification, illustrate a preferred embodiment of the invention and, together with the description, serve to explain the principles of the invention.

DETAILED DESCRIPTION OF THE PREFERRED EMBODIMENT

Figure 1:
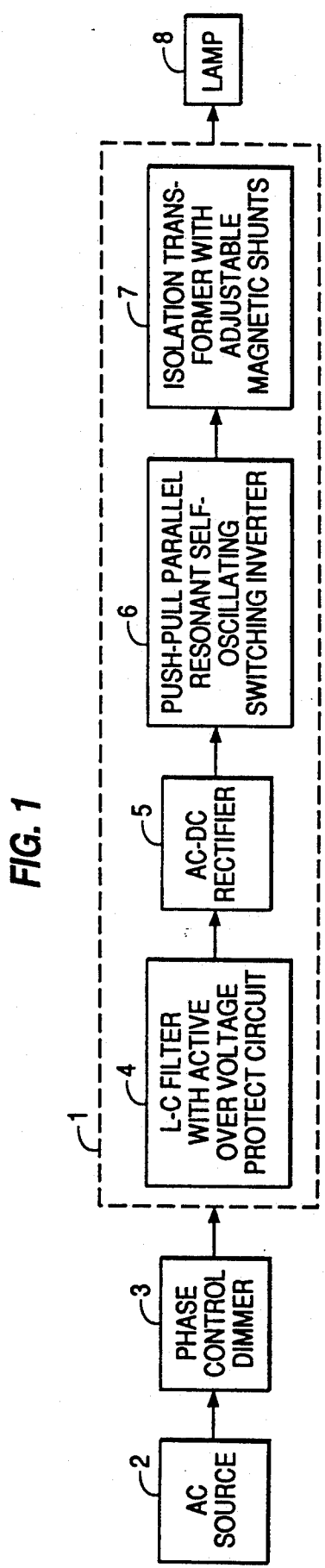
FIG. 1 is a block diagram of the electronic dimmable ballast for gas discharge lamps in accordance with a preferred embodiment of the present invention.

Reference will now be made in detail to the present preferred embodiments of the invention, examples of which are illustrated in the accompanying drawings in which like reference characters refer to corresponding elements.

FIG. 1 is a block diagram of the dimmable ballast circuit of the present invention. The dimmable ballast circuit 1, enclosed in the dashed lines, provides a variable amount of sinusoidal power to a gas discharge lamp(s) 8. The level of output power of circuit 1 depends on the conducting phase angle of a phase control dimmer 3. In accordance with the present invention, the dimmable ballast circuit 1 includes L-C filter means 4, rectifier means 5, push-pull parallel resonant self-oscillating switching inverter means 6 and impedance matching output isolation transformer means 7. As embodied herein, the L-C filter means 4 receives the variable chopped AC input current from the phase control dimmer 3 and smooths the variable chopped AC input current and thus improves the overall power factor. Also the Q factor of L-C filter means 4 works like a passive feedback gain and maintains nearly constant output power. The design of the inductor L of L-C filter means 4 provides both common-mode and differential-mode filter functions which prevents high frequency noise from being fed back to the power source 2. The L-C filter means 4, as shown in FIG. 2a, is supplied with an active over-voltage protection circuit 4, as shown in FIG. 2b, to avoid overloading the ballast 1 when lamp 8 is removed. The inductor L of L-C filter means 4 can be constructed from El steel lamination with an air gap and the capacitor C of L-C filter means 4 can be constructed from a metal film capacitor. The inductor L of the L-C filter 4 is approximately 0.3 H and the capacitor C of L-C filter 4 is approximately 0.68 to 2.2 µF. As embodied herein, the AC-DC rectifier means 5 converts the AC voltage input from the L-C filter means 4 into a DC voltage which is provided to the inverter means 6. The AC-DC rectifier means 5 can be constructed from a suitable 1A, 400 v diode. As embodied herein, the switching inverter means 6 is a push-pull, voltage feedback, self-oscillating, parallel resonant circuit with a DC base drive. Therefore, inverter means 6 has very low switching and saturation losses. As embodied herein, the output isolation transformer means 7 has loose coupling between the primary and the secondary windings. Transformer means 7 also includes a pair of magnetic shunts. By adjusting the position of the shunts, the leakage inductor and the coupling factor can be adjusted. The location of filament windings in the transformer means 7 makes the filament voltage increase when the light output is reduced.

Figure 2:
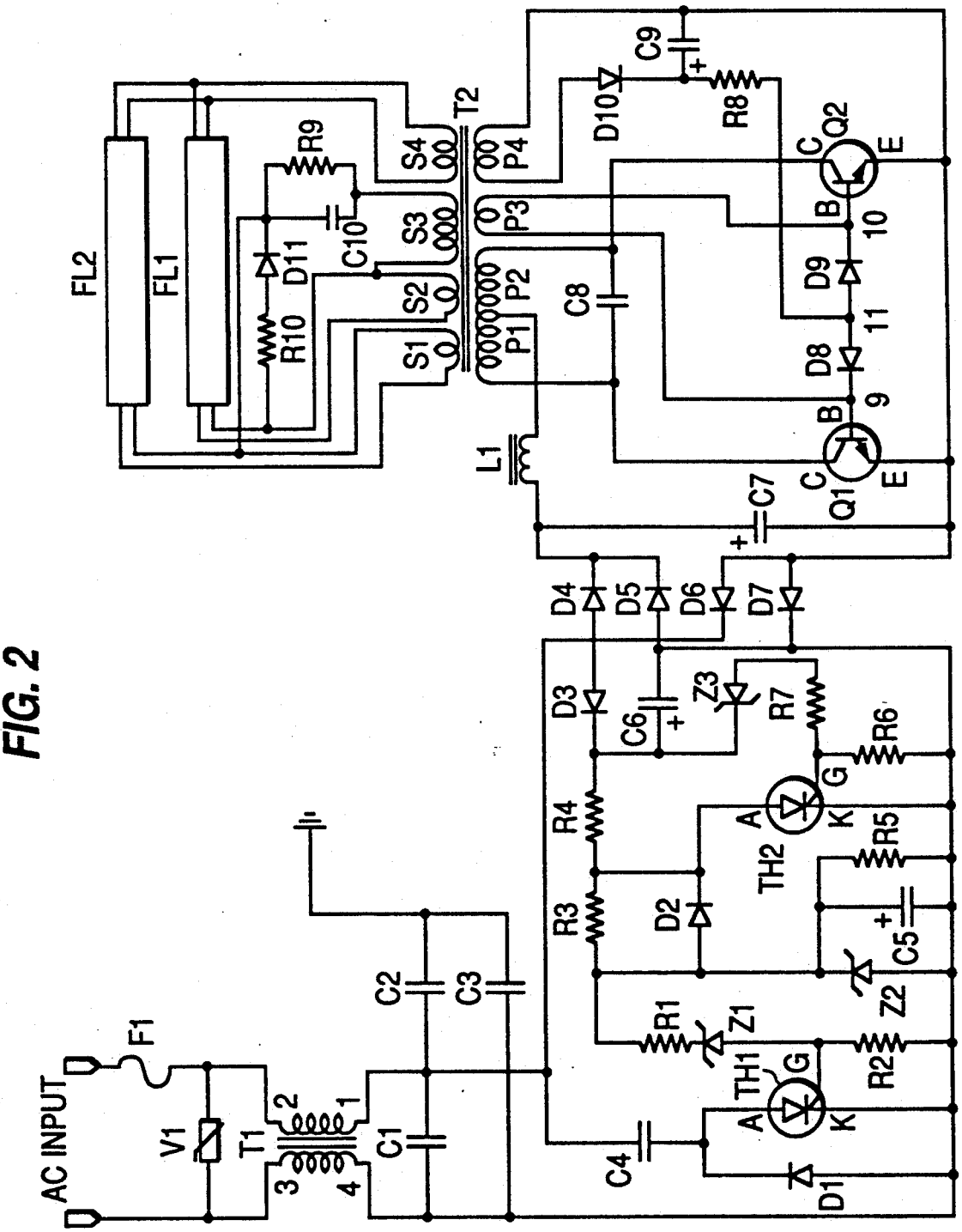
FIG. 2 is a detailed circuit diagram of the electronic dimmable ballast in accordance with a preferred embodiment of the present invention.
Figure 2A:
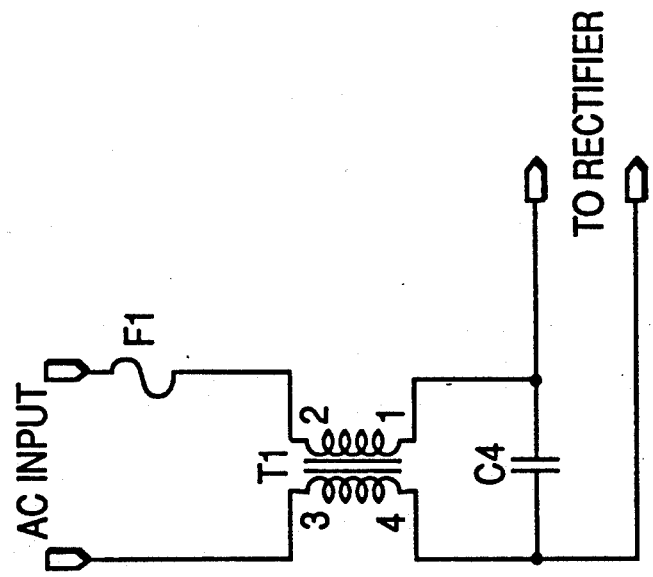
FIG. 2a is a simplified circuit diagram for the input L-C filter shown in block 4 of FIG. 1.
Figure 2B:
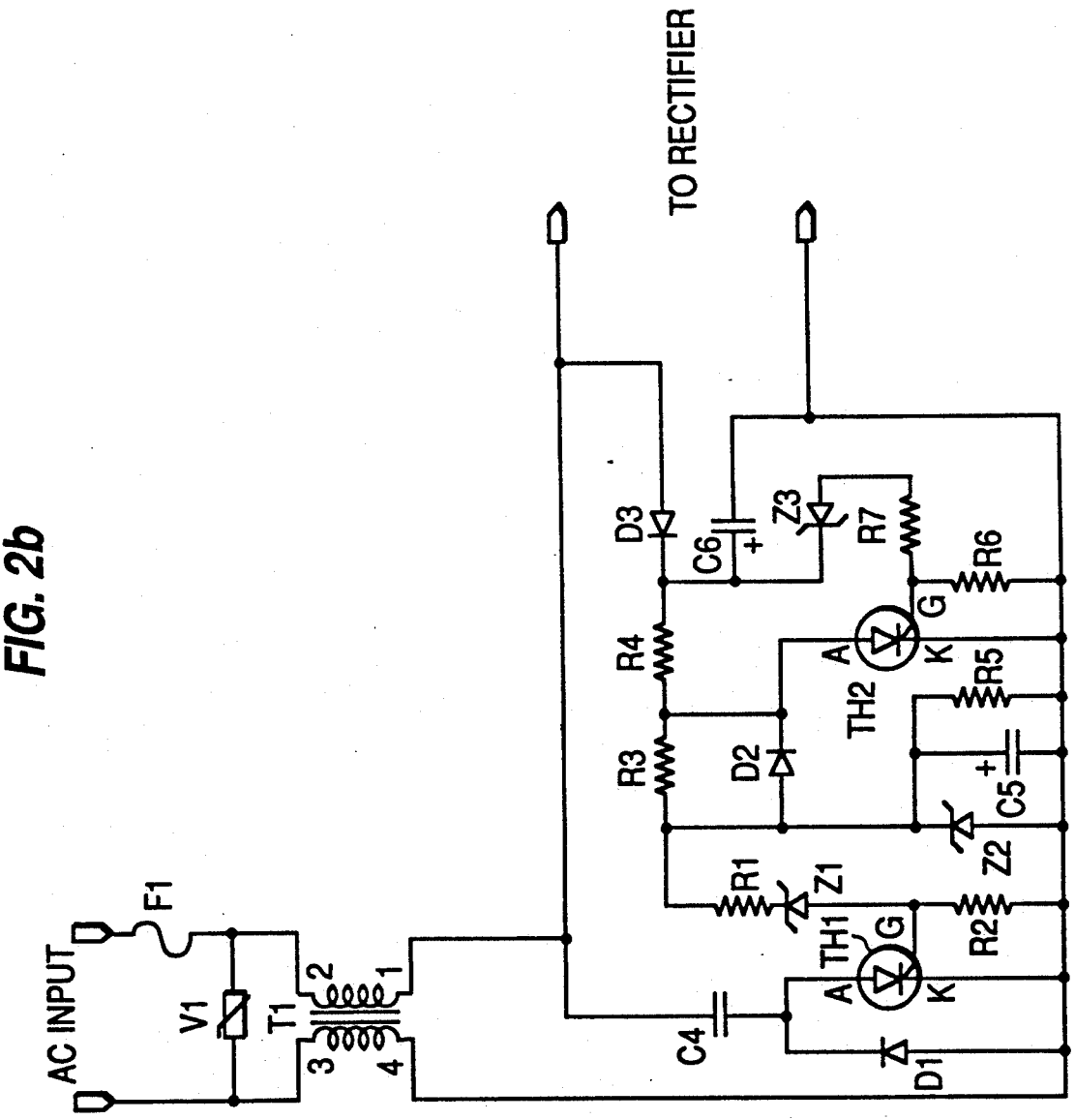
FIG. 2b is a circuit diagram illustrating in further detail the input L-C filter with the delayed start and active over voltage protection circuit of block 4 of FIG. 1.
Figure 2C:
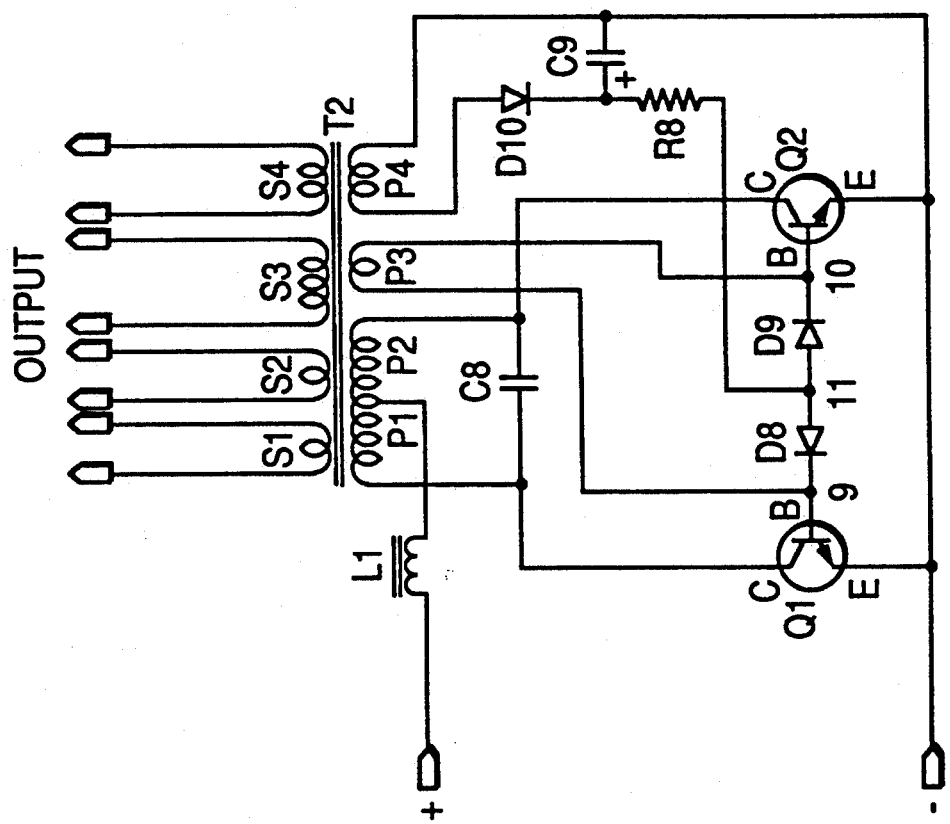
FIG. 2c is a more detailed circuit diagram of the self-oscillating switching inverter shown in block 6 of FIG. 1 and the isolation transformer T2 shown in block 7 of FIG. 1.

FIG. 2 illustrates the detailed circuit diagram for the dimmable ballast 1. The sinusoidal high frequency voltage is generated by switching inverter means 6. Inverter means 6, as shown in FIG. 2c, includes a push-pull, voltage feedback, self oscillator with an external inductor L1 and a tuning capacitor C8 which is across primary coil P1–P2 of the isolation transformer T2. The ferrite core of inductor L1 is designed to have a high impedance of approximately 500Ω at the resonant frequency. Therefore, an almost constant current is supplied to the center tap of primary coil P1–P2. Inverter means 6 oscillates at the resonant frequency which is determined by C1 and P1–P2. In inverter means 6, the transistors Q1 and Q2 work in the well known voltage feedback, push pull oscillator fashion. Inverter means 6 also includes a symmetric DC bias drive circuit which includes D8, D9, D10, R8, C9 and winding P3–P4, connected as shown in FIG. 2c.

In general, a switching inverter has two major losses, one is called switching loss, the other is called saturation loss or switch-on loss. The inverter means 6 in circuit 1 switches at the resonant frequency using voltage feedback. Therefore, it only switches when the voltage across the collectors and the emitters of the transistors, Q1 and Q2 become zero or near zero. This technique limits the switching loss to a minimum. The switch-on loss depends on the saturation voltage. The coil P3 is the voltage feedback winding and is tightly coupled to primary coil P1–P2. Therefore, the voltage across coil P3 is in phase with the voltage across the capacitor C8. When point 9 is negative and point 10 is positive, the transistor Q1 is off and the transistor Q2 is on. At the same time, the voltage at point 11 following the voltage at point 9 becomes negative and the diode D9 is turned off. The value of the base current of transistor Q2 is given by the following equation:

$$I_b = \frac{(V_{C9} + V_{P3})}{R8} \quad (1)$$

When transistor Q1 is on, its base current is the same as in Eq. (1). Because $V_{C9}$ is nearly constant, $I_b$ is defined by $V_{C9}$ and resistor R8. Thus, by properly choosing the value for R8, both transistors Q1 and Q2 are evenly driven into the deep saturation regime. Consequently, the switch-on loss in this circuit is very small. The transistors Q1 and Q2 generate little heat so that the efficiency of inverter means 6 is very high without a complicated circuit design. The cost of inverter means 6 is relatively small.

Generally, a gas discharge lamp has a negative voltage-current relation. Normally, in order to operate a gas discharge lamp, the ballast must have a high voltage output to start the gas discharge lamp, and a current limiter, which is usually an inductive choke or a capacitor, to keep the gas discharge lamp current within the operating range.

Figure 2D:
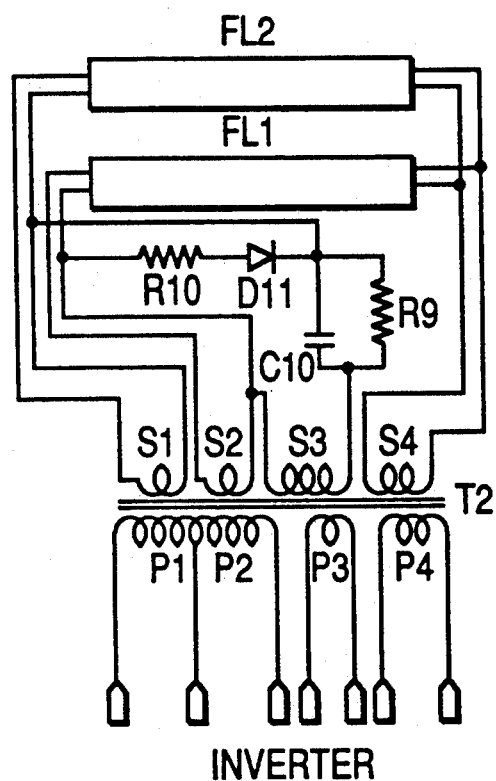
FIG. 2d is a more detailed circuit diagram of the isolation transformer, the striation elimination circuitry and the low crest factor circuitry.

The present invention employs a specially designed output transformer T2, as shown in FIGS. 2, 2c and 2d which has a loose, adjustable coupling between the primary and the secondary windings. The primary windings of transformer T2 include the coils P1-P2, P3, and P4, while the secondary windings include the coils S1, S2, S3, and S4. The ballast circuit 1 of the present invention takes advantage of the natural leakage inductance of transformer T2. This leakage inductance functions in the same manner as the external inductance of a current limiting choke coil.

Figure 3:
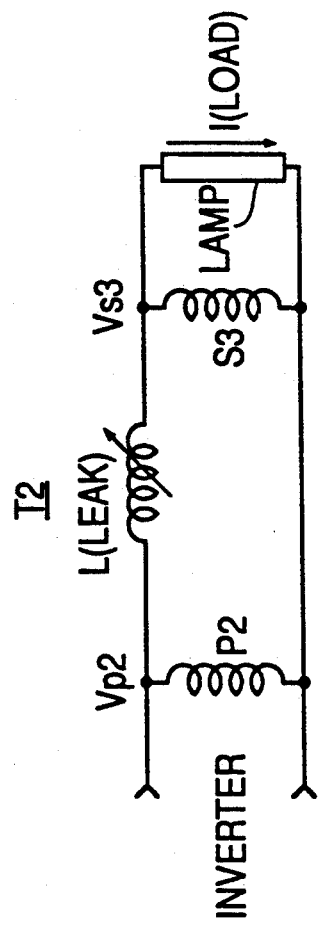
FIG. 3 is the equivalent circuit for the output transformer T2 of FIG. 2 in accordance with a preferred embodiment of the present invention.

FIG. 3 shows the equivalent circuit of transformer T2. When a voltage is initially applied to the gas discharge lamp 8, there is no current through lamp 8 and there is no voltage drop on $L_{leak}$ and:

$$V_{S3} = V_{P2} \frac{S3}{P2} \quad (2)$$

and $$I_{load} = 0 \quad (3)$$

By choosing the proper ratio of the value S3 to P2, $V_{S3}$ will be high enough to start the lamp 8. The ratio selected in the preferred embodiment is about 3.5:1 for a T-12 lamp. After the lamp 8 is started, the impedance of the lamp 8 equals:

$$I_{load} = \frac{V_{P2}}{L_{leak}} \quad (4)$$

By properly adjusting $L_{leak}$, we can keep $I_{load}$ in the normal operating range of the gas discharge lamp 8.

One common transformer core material is ferrite. Most manufacturers' specifications for ferrite give a ±20% variation for the permeability of the ferrite. A variation in the permeability of the core material will result in a variation of the leakage inductance of transformer T2. This will cause the light output level of lamp 8 to be different for each ballast 1 controlled by the same dimmer circuit. The different light intensities will be noticeable at low light level (<10% of full brightness).

Figure 4:
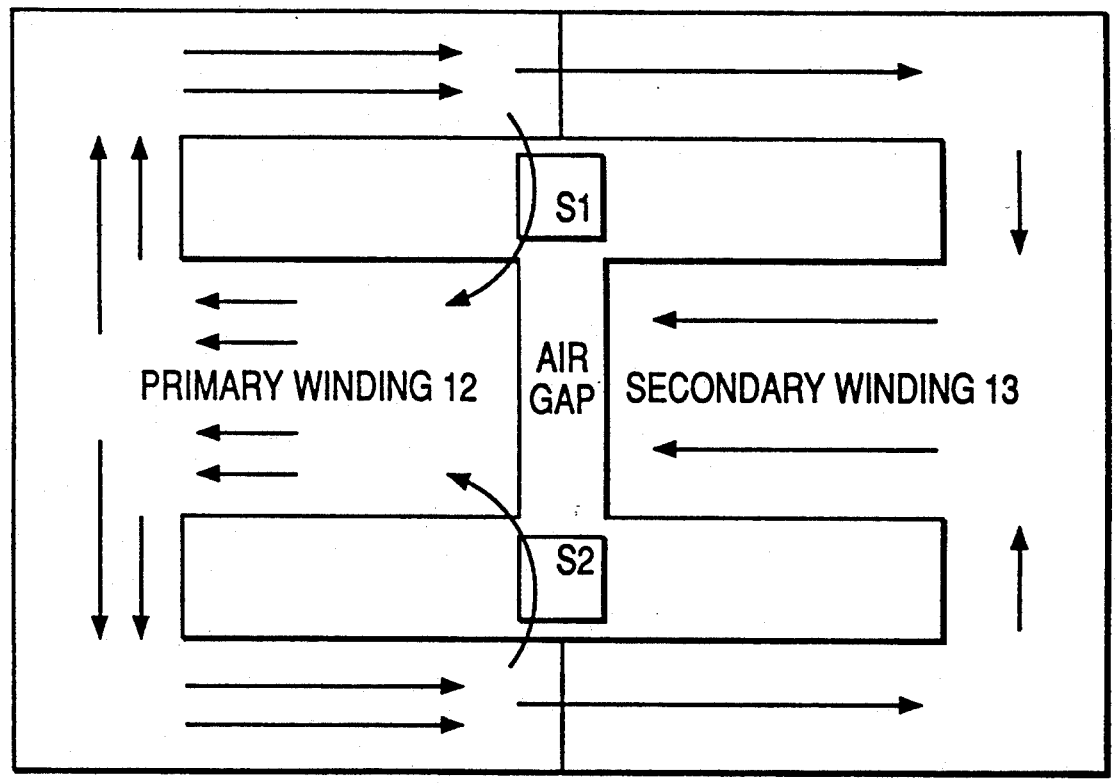
FIG. 4 illustrates the path for the magnetic flux in the transformer T2 of FIG. 3.

To prevent this disadvantage, we have introduced two magnetic shunts, S1 and S2 as illustrated in FIG. 4. By adjusting the positions of magnetic shunts S1 and S2, we can control the leakage inductance of transformer T2 to within ±5% or less. In addition, the shunts S1 and S2 introduce a new path for the returning flux of the primary windings of the output transformer T2. This dramatically reduces the leakage magnetic field.

Figure 5:
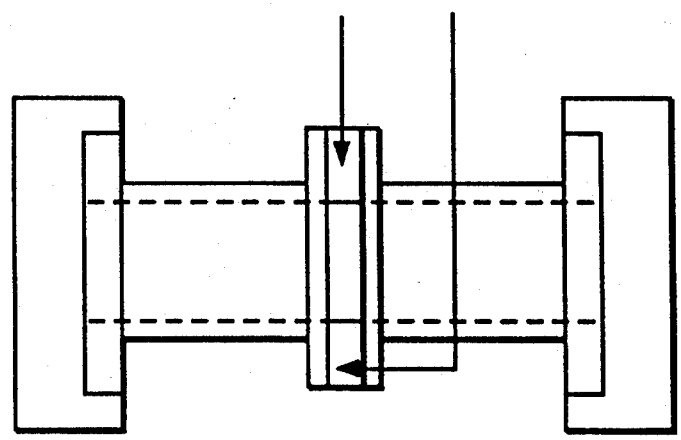
FIG. 5 is a more detailed illustration of the bobbin design for the transformer for the electronic dimmable ballast in accordance with a preferred embodiment of the present invention.
Figure 5:
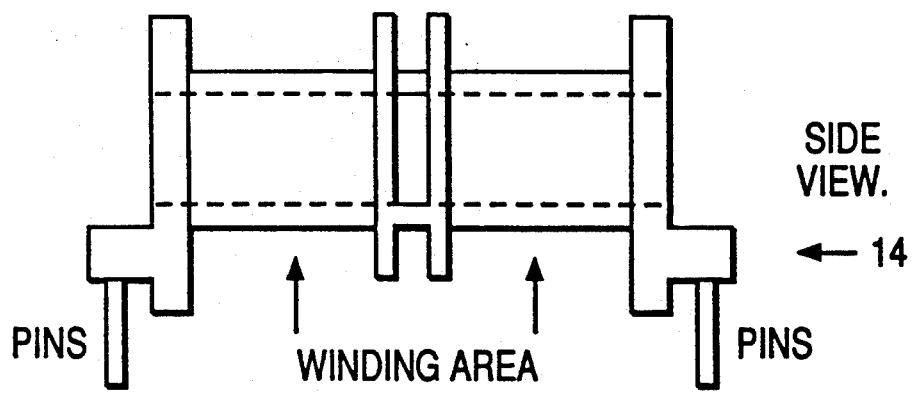

The detailed structure of the output transformer T2 is shown in FIG. 4 and FIG. 5. In FIG. 4, a pair of E-shaped ferrite cores face each other with an air gap. The primary and secondary windings 12 and 13 are separated from each other by a pair of shunt housings 15 as shown in FIG. 5. These magnetic shunts can be easily moved inside the shunt housings. By adjusting the positions of the shunts, the parameters of the transformer can be adjusted. The positions of these shunts are determined by the size of the shunts and the output power of the ballast.

All of the coils are wound on a special bobbin 13 which is shown in FIG. 5. On the primary winding side, coils P1 and P2 have an equal number of turns, approximately 50 turns, and are wound first. Then coils P3 and P4 are wound on top of coils P1-P2. On the secondary side, shunt S3 is wound first and shunts S1, S2, and S4 are wound on top of shunt S3. Shunts S1, S2 and S4 have an equal number of turns, each having 3 turns, however, shunt S4 is wound with larger diameter wire.

As discussed previously, the gas discharge lamp 8 has a negative V-I characteristic. When the lamp current is reduced (or dimmed), the voltage across lamp 8 will be increased. Therefore, the output voltage of shunt S3 has to be increased. By locating shunts S1, S2 and S4 on top of shunt S3, they are tightly coupled to each other. The voltage across shunts S1, S2, and S4 depends on the voltage across shunt S3. Since shunts S1, S2, and S4 supply the filament voltage to the lamp 8, this voltage will increase when the brightness level of the light is reduced. This feature will increase the life of the lamp 8 substantially. In the same manner, before the lamp 8 is turned on, shunt S3 provides a high output voltage to the lamp 8 (see Eq. 2). Therefore, these filaments have an initial voltage of about 3.5 v which is higher than the normal operating voltage of about 6 v for a short period of time (about 0.5 second). This will operate to preheat lamp 8 efficiently and also add to the lifetime of the lamp 8.

The circuit 1 includes an L-C input filter 4, shown in FIG. 2a, which consists of transformer T1 and capacitor C1, located in front of the ballast 1. The inductance of transformer T1 is purposely set quite large at approximately 0.3 H so that the filter 4 can smooth the input current which is a chopped sine wave from the TRIAC dimmer 3. The equation to define the output voltage of filter 4 is:

$$V_{out} = \frac{V_{in}}{-\omega^2 LC + \frac{j\omega L}{R} + 1} \quad (5)$$

In equation (5), resistor R represents the overall load. Eq. (5) defines the output voltage of a low pass filter. As a low pass filter, the input filter 4 attenuates high frequency components from the chopped sine wave at the input. The use of the low pass filter improves the power factor. More importantly, this filter is a second order filter. It has a resonant frequency which is $(LC)^{-\frac{1}{2}}$ and a Q factor which is determined by R/L. The choke T2 has a high impedance at the resonant frequency of inverter means 6. Therefore, inverter means 6 (and thus the lamp 8) see a current source at their input. When the lamp 8 of the present invention operates at low light levels, it generates less heat. This will tend to reduce the brightness of the lamp 8 for a fixed input current. At sufficiently low light levels, below approximately 5% of the full brightness, the lamp 8 may self extinguish.

Fluorescent lamps have a negative resistance, and the lamp light output is proportional to the current through the lamp. When the current is reduced, the lamp resistance increases which increases the load resistance R. When the value of load resistance R increases, the Q factor becomes larger and $V_{out}$ increases (see equation (5)). Consequently, the voltage across capacitor C7 increases causing the lamp current to increase. This results in a closed loop, passive feedback system in which Q represents the feedback gain. Therefore, by properly choosing the value of inductor L, the value used in the preferred embodiment is 0.3 H, the lamp current will be constant at reduced light levels. The light output will be stable and uniform without any additional components.

The transformer inductor T1, as shown in FIG. 2, has two identical coils and is symmetric with reference to the input lines. The magnetic field lines from the two coils are in the same direction. T1 is designed with an air gap in the core. This gives the filter 4 two modes which are referred to as common and differential modes. The common mode filter function will further reduce the high frequency noise fed back to the power source from the inverter 6. This substantially reduces radio interference.

As discussed above, adding a small DC voltage bias to the lamp 8, will eliminate the standing wave condition or striations appearing in lamp 8. In order to add the DC voltage bias, a resistor R10 and a diode D11 are added to the circuit. R10 and D11 are in series with each other and in parallel with the lamps as shown in FIG. 2d. R10 is approximately 200 kΩ. D11 is comprised of a light voltage fast recovery diode greater than 600 v. Resistor R10 and diode D11 charge capacitor C10 with a small DC voltage. Capacitor C10 is used to block DC current or voltage from the transformer T2 when the lamp 8 acts as a diode (referred to as the "diode effect"). Resistor R9 is used to discharge capacitor C10. In the preferred embodiment, R9 is 2 MΩ. When capacitor C10 has a small charge $V_{C10}$, the lamp voltage is defined by the following equation:

$$-V_{lamp} = V_{S3} + V_{C10} \quad (6)$$

Where the $V_{lamp}$ is the voltage across the lamp 8, $V_{S3}$ is the output voltage from shunt S3. Thus the voltage across the lamp has a small dc component. By reducing the value of resistor R10, the striations change from stationary to slowly moving. The striations move faster when the value of resistor R10 is reduced. When resistor R10 is less than or equal to about 200 KΩ, the striations will no longer be seen because they are moving too rapidly to be perceived.

Capacitor C10 and inductor $L_{leak}$ form a serial resonant circuit. Choosing the value of C10 such that (C10 $L_{leak})^{-\frac{1}{2}}$ is approximately three times the inverter operating frequency causes the lamp drive current to approximate a square wave. This feature significantly reduces the crest factor of the ballast 1.

As discussed above, the input filter 4, shown in FIG. 2, comprised of transformer T1 and capacitor C4 is a second order filter. The voltage across capacitor C4 (or $V_{C4}$) is dependent on the Q factor of the filter. Because the Q factor is greater than 1, $V_{C4}$ is higher than the input voltage. By introducing a switch into this filter a delayed start can be implemented and the ballast 1 can be protected from an open load condition (which occurs when the lamp is broken).

In FIG. 2b, the capacitor C4 connects the transformer T1 through the parallel combination of diode D1 and SCR thyristor TH1 which acts as a switch. When the power is turned on, the voltage across capacitor C5 is zero and there is no current through the gate G of thyristor TH1. Therefore, thyristor TH1 is off and capacitor C4 and transformer T1 do not form a resonant filter. Thus $V_{C7}$ is reduced proportionate to a reduction in $V_{S3}$. The value of $V_{S3}$ is not high enough at 400 volts, to start the lamp 8. However $V_{S1}$, $V_{S2}$ and $V_{S4}$ provide enough power to preheat the lamp filaments. Capacitor C5 will be charged through diode D3 and resistors R3 and R4. When $V_{C5}$ is higher than $V_{Z1}$, the zener voltage of zener diode Z1, there is current through the gate G of thyristor TH1; thus, thyristor TH1 is turned on. This permits ac current to flow through C4, and $V_{C7}$ is set at the normal operating level of approximately 160 v. Thus the ballast 1 is operating in a normal manner. The delay time is equal to (R3+R4) C5. Resistor R1 serves as a current limiter, resistor R2 protects the gate of thyristor TH1, and zener diode Z2 limits the voltage across capacitor C5. Resistor R5 serves to discharge capacitor C5.

When the load 8 is removed, the Q of the input filter 4 increases as described by Eq. 5 and the values for $V_{C4}$ and $V_{C6}$ are high. When $V_{C6}$ is greater than the zener voltage of Z3, current flows through the gate G of thyristor TH2 and thyristor TH2 is turned on. In this case, thyristor TH2 pulls down the voltage level of VC5 through diode D2. When $V_{C5}$ is lower than the zener voltage of Z1, zener diode Z1 and thyristor TH1 are turned off, and capacitor C4 and transformer T1 do not form a resonant filter. In this case, transistors Q1 and Q2 are protected from high supply voltage and the ballast 1 draws low power under a no load condition. This feature eliminates overheating of the ballast 1 when the load 8 is removed. Resistor R7 is a current limiter, resistor R6 protects the gate of thyristor TH2, and resistor R4 supplies a holding current for thyristor TH2. In this circuit the SCR can be replaced by any suitable semiconductor devices (e.g., an FET transistor or a silicon bidirectional switch (SBS)). The overvoltage or no load signal can be picked up from either the AC side (before rectifier D4, D5, D6 and D7) or the DC side (after rectifier D4, D5, D6 and D7).

Thus, the dimmable electronic ballast of the present invention has been designed with a reduced number of components thereby enabling it to be produced relatively inexpensively and enabling it to be operated more efficiently. It can be controlled by a traditional two wire, phase controlled dimmer. It includes an AC line filter to improve the power factor and reduce radio frequency interference. It also includes a delayed starting feature and an overvoltage protection feature. Thus, it provides a design which eliminates some of the problems inherent in prior dimmer circuits.

It will be apparent to those skilled in the art that various modifications and variations can be made in the circuit of the present invention without departing from the scope or spirit of the invention. Thus, it is intended that the present invention cover the modifications and variations of this invention provided they come within the scope of the appended claims and their equivalents.

What is claimed is:

1. A dimmable electronic ballast for one or more gas discharge lamps, each lamp including a filament, comprising:
    L-C filter means for receiving a variable chopped AC input current from an AC power source and for smoothing said received variable chopped AC current and for outputting smoothed AC current;
    AC-DC rectifier means, connected to receive the smoothed AC current output from the L-C filter means and acting to convert the smoothed AC current to DC voltage and outputting said DC voltage;
    push-pull parallel resonant self-oscillating switching inverter means, connected to receive the DC voltage output from the AC-DC rectifier means, for generating and outputting a sinusoidal high frequency voltage; and
    isolation transformer means, connected to receive the sinusoidal high frequency voltage output from the switching inverter means, for adjusting the light level of the gas discharge lamp.

2. The dimmable electronic ballast of claim 1 wherein the L-C filter means includes an active overvoltage protection circuit.

3. The dimmable electronic ballast of claim 1 wherein the isolation transformer means includes a pair of adjustable magnetic shunts.

4. The dimmable electronic ballast of claim 2 wherein the isolation transformer means includes a pair of adjustable magnetic shunts.

5. The dimmable electronic ballast of claim 1 wherein the isolation transformer means includes circuit means for obtaining a leakage inductance for ballasting the current of the gas discharge lamp and for maintaining the voltage of the filament.

6. The dimmable electronic ballast of claim 2 wherein the isolation transformer means includes circuit means for obtaining a leakage inductance for ballasting the current of the gas discharge lamp and for maintaining the voltage of the filament.

7. The dimmable electronic ballast of claim 1 wherein the inverter means includes:
    a push-pull, voltage feedback self oscillator including a pair of transistors, an external inductor and a tuning capacitor, wherein said tuning capacitor is connected across a primary coil of said isolation transformer means.

8. The dimmable electronic ballast of claim 1 further comprising:
    DC voltage striation eliminating circuit means, connected to said isolation transformer means, including:
    (a) a first resistor;
    (b) a diode connected in series with said first resistor, said first resistor and said diode connected in parallel with said gas discharge lamps;
    (c) a capacitor, connected to said first resistor and said diode such that said first resistor and said diode charge said capacitor with a small DC voltage, said capacitor acting to block DC voltage from said isolation transformer means when said gas discharge lamps act as diodes; and a second resistor, connected to said capacitor, and acting to discharge said capacitor.

9. The dimmable electronic ballast of claim 1 further comprising:

crest factor improvement circuit means, connected to said DC voltage striation eliminating circuit means including said capacitor and a leakage inductance of said isolation transformer means connected to form a serial resonant circuit, wherein the value of (capacitor X leakage inductance)$-\frac{1}{2}$ is equal to three times the operating frequency of the inverter means.

* * * * *